US007083755B2

(12) United States Patent
Drummond et al.

(10) Patent No.: US 7,083,755 B2
(45) Date of Patent: Aug. 1, 2006

(54) METHOD OF MANUFACTURING A SOLAR COLLECTOR PANEL

(75) Inventors: Noel Richard Drummond, Grafton (AU); Gerard Anthony Litchfield, Southport (AU); Marquis Charles Fabian, Jandowae (AU)

(73) Assignee: Solartherm International PTY Ltd., Queensland (AU)

( * ) Notice: Subject to any disclaimer, the term of this patent is extended or adjusted under 35 U.S.C. 154(b) by 0 days.

(21) Appl. No.: 10/238,460

(22) Filed: Sep. 10, 2002

(65) Prior Publication Data
US 2003/0127089 A1 Jul. 10, 2003

Related U.S. Application Data

(63) Continuation-in-part of application No. PCT/AU01/00266, filed on Mar. 12, 2001.

(51) Int. Cl.
B29C 41/04 (2006.01)
B29C 33/42 (2006.01)

(52) U.S. Cl. .................. 264/311; 264/325; 425/435

(58) Field of Classification Search ........ 264/309–311, 264/325; 425/435
See application file for complete search history.

(56) References Cited

U.S. PATENT DOCUMENTS 4,397,305 A * 8/1983 Keefe .................. 126/448
4,471,759 A   9/1984 Anderson et al.
6,126,881 A * 10/2000 Eckert .................. 264/245

FOREIGN PATENT DOCUMENTS

| AU | 65934/94 A | 1/1995 |
| AU | 15031/97 A | 9/1997 |
| DE | 2900251 A | 12/1980 |
| DE | 3913552 A | 10/1990 |

* cited by examiner

Primary Examiner—Stefan Staicovici
(74) Attorney, Agent, or Firm—Gifford, Krass, Groh, Sprinkle, Anderson & Citkowski, P.C.

(57) ABSTRACT

A method of manufacturing an integral one-piece solar collector panel 10 by a rotational moulding process is disclosed. The solar collector panel 10 has a plurality of fluid ways 15 extending between opposed ends 18, 19 and transverse headers 18, 19 opening into the open ends of the fluid ways 15. The panel 10 is moulded by a rotational moulding process using mould faces with a non planar topography, eg in the form of a plurality of lines projecting outwardly proud of the remainder of the mould plate. This enables areas of the moulded body 12 to be formed that are not hollow and form a solid wall in the moulded panel and other areas of the body to be formed that are hollow and form the fluid ways 15 and headers 18, 19. After the moulding of the panel 10 has taken place the two opposed mould faces are moved towards each other to cause the contacting layers of mould material to firmly adhere to each other.

10 Claims, 12 Drawing Sheets

METHOD OF MANUFACTURING A SOLAR
COLLECTOR PANEL

CROSS REFERENCE TO RELATED APPLICATION

This patent application is a continuation-in-part of International Application No. PCT/AU01/00266 which designates the United States.

FIELD OF THE INVENTION

This invention relates to a method of manufacturing a solar collector panel and to a panel produced by the method. It also relates to a solar hot water heater incorporating the aforesaid panel.

This invention relates particularly but not exclusively to a solar collector panel for a domestic hot water system, for supplying heated water, that is mounted on the roof of a dwelling. It will therefore be convenient to hereinafter describe the invention with reference to this example application. However it is to be clearly understood that the invention is capable of broader application. For example, the invention may also be used to preheat water for low level heating applications, eg to heat swimming pools, aquaculture ponds, and the like.

BACKGROUND TO THE INVENTION

Water heaters that use solar energy are well known. Typically such heaters comprise a solar collector panel for heating up water and a water tank for storing the heated water prior to use. The panel is mounted on a roof with a sloping orientation such that the panel has an upper end and a lower end and is positioned so as to catch radiant energy from the sun. The panel is operatively coupled to a tank. Structurally the panel has a plurality of fluid ways extending between the upper and lower ends and the panel also has upper and lower headers communicating with the open ends of the fluid ways. The heater also has at least two conduits, eg located externally of the collector panel, coupling the panel to the tank. Specifically one said conduit couples the upper header with the tank and the other said conduit couples the tank with the lower header. Thus the heater overall facilitates water flow up through the fluid ways and into the tank.

In use solar energy from the sun heats up the panel by radiant heat transfer which in turn transfers heat to water in the fluid ways by convective and conductive heat transfer. This causes the water to expand and decrease in density causing it to travel up the fluid ways and into the upper header. From there the water passes into the tank for storage from where it is drawn for use when required. Within the tank the warmer water tends to move towards the top of the tank because of natural fluid convection within the tank. Inside the tank the cooler water is displaced by the warmer water to the bottom of the tank. A conduit links the bottom of the tank with the lower header and cooler water is drawn off the tank as freshly heated water from the upper header is introduced into the tank. This cooler water then passes from the lower header into the fluid ways where it is presented for heating in the manner described above and the cycle is repeated. This principle of circulating water through this heating system by natural convection is known as a thermosiphon effect and is well known. Using this system it is possible to heat water up to a temperature of 70° C. or even higher for use as domestic hot water for cleaning and washing.

This basic structure and principle of operation of the thermo-siphon effect has been described in many publications. Some such publications are AU 65934/94, AU 24885/95 and AU 15031/97. The contents of these specifications are hereby explicitly incorporated into the specification by direct cross reference.

However the heaters described above have some structural shortcomings. Firstly many solar collector panels comprise an assembly of pipes and sheets that is fabricated in a fairly elaborate metal working process. The fluid ways are made of pipes as are the headers and these have to be attached to each other, eg by welding or soldering. The pipes in turn are housed within a housing including a perimeter frame that has to be fabricated and the housing then has to be attached to the pipes. In addition couplings have to be provided for attachment of the external conduits to the headers in the panel. Finally a transparent cover sheet is mounted over the top of the pipes to reduce heat loss due to convection from the pipes. As a result the manufacture of the panel is fairly expensive.

In addition existing heaters also have some operational shortcomings. The pipes and headers are welded or soldered and these welds or solders are prone to failure when the piping is exposed to cold temperatures, eg frost conditions. The expansion of water in the pipes when it freezes causes these failures. The cost of repairing these welds or solders is substantial as the repairs need to be carried out by a qualified fitter usually on site.

A further operational shortcoming is that the metal pipes are susceptible to scale build up due to salts in the water such as calcium carbonate. This problem is well known in the boiler and water heater arts. While technology is available to resist this problem and/or clean the pipes the cost of descaling these pipes can be substantial. These above two operational shortcomings provide an incentive to move away from metal or steel pipes.

There is almost universal acceptance of the desirability of using solar heating to heat domestic water. It is a renewable energy source and reduces the reliance on electrical energy that is produced by coal fired power stations. This is recognised by many regulators and governments around the world. For example in Australia financial incentives in the form of rebates are offered to people installing solar hot water heating systems in their homes.

Applicant believes that the advantages of converting to solar heating are clear and that a major impediment to the widespread uptake of the technology is the capital cost of the existing systems and the maintenance problems described above. In particular the cost of a collector panel which is fabricated from metal is very high. Applicant believes that if these problems could be significantly reduced there would be a quantum increase in the uptake of the technology. Applicant believes that this would have the potential to make the use of solar heaters in domestic homes a standard feature in areas having high levels of sunlight.

Clearly therefore it would be advantageous if a lower cost solar heating system could be devised. Specifically it would be advantageous if a new and different way of manufacturing a solar collector panel could be devised that simplified the structure of the panel and reduced the cost of the panel.

SUMMARY OF THE INVENTION

According to one aspect of this invention there is provided a method of manufacturing a solar collector panel having two opposed ends defining a plurality of fluid ways having open ends extending there between and defining transverse headers communicating with the ends of the fluid ways, the method comprising:

providing a mould defining opposed mould faces that are spaced apart from each other wherein the spacing between the mould faces is not equal across the surface of the faces;

inserting a mould material into the mould and moulding a body by a rotational moulding process so as to produce a layer of material of substantially uniform thickness across the surface of the mould faces; and allowing the mould and body to cool after the layer of material has been evenly moulded onto the mould surface and then removing the body from the mould;

whereby the unequal spacing between the mould surfaces facilitates the formation of a said panel with areas that are not hollow and other areas that have hollow passages defined therein, the hollow passages defining the fluid ways and transverse headers and the non-hollow areas defining the walls between the fluid ways.

The technique of rotational moulding is a well known moulding technique that can be used to manufacture articles of intricate shape. It involves rotating a mould about two orthogonal axes to deposit an even layer of mould material onto the surface of the mould. The shape of the article is determined by the shape of the mould. The thickness of the layer of deposited material can be controlled by metering the quantity of mould material that is introduced to the mould at the start of the process.

Firstly the invention involves an appreciation that by a suitable variation of the spacing of the mould surfaces or topography of the mould surfaces, rotational moulding can be used to produce a body having a plurality of fluid ways in a single moulding process. Specifically the applicant has appreciated that rotational moulding could be used to produce a body having a plurality of parallel extending fluid ways in one direction and interconnecting headers extending in a transverse direction. This works on the principle that rotational moulding deposits an even layer of material on the mould surface and that by appropriate configuration of the mould surfaces, such a body can be moulded.

The fluid ways and headers are formed by having the opposed mould surfaces spaced further apart from each other than the other areas of the faces which are relatively closer together. The layers of mould material on the mould faces that are closer together are urged into adhesive contact with each other and form the walls intermediate the fluid ways. The other areas form the fluid ways and headers in the body.

The invention also involves the appreciation that a solar collector panel might be able to be manufactured, eg as a single piece of plastics material, in a moulding process and that this would be a simpler and considerably less expensive way of producing a panel than the current metal fabrication techniques. The applicant has also appreciated that if a solar collector panel was made of plastics material it would not be susceptible to the deposit of scale and the solder and welding failures that frequently occur in metal collector panels and which require costly maintenance.

The applicant has also appreciated that plastics material has a sufficiently high coefficient of thermal conductivity to enable it to be used in an application where it is required to conduct heat and that it has sufficiently resilient engineering properties to be used in an application where it is deliberately exposed to the suns rays for a number of years without undergoing substantial deterioration.

The non-uniform spacing between the mould faces may comprise at least one said mould face having a non planar topography across its surface whereby to form the non hollow walls and hollow fluid ways, and preferably both said mould faces have a non-planar topography.

The non planar topography may comprise at least one mould face having one or more areas projecting outwardly proud of the remainder of the mould face, eg extending substantially linearly from one end of the panel to the other.

The method may include the further step of moving at least one of the mould faces, and thereby the layers of moulded material on the faces towards each other, after the moulding step has been carried out and before the body is given time to cool substantially. This is to urge the layers of moulded material forming said non hollow areas of the body firmly into adhesive contact with each other to achieve fluid sealing of the walls between adjacent fluid ways. The mould faces may be moved towards each other by a distance of at least 5 mm, preferably 10 mm, more preferably 10 to 50 mm, and most preferably 15 to 35 mm.

This squashes or clamps the layers associated with each mould surface firmly into adhesive contact with each other and seals the layers to each other so that fluid cannot laterally flow out of one fluid way and into the adjacent fluid way. This assists the fluid ways to efficaciously function like the pipes of conventional fabricated solar panels, i.e. to withstand the hydrostatic pressure of the water flowing through the fluid way. This is known in the moulding art as achieving satisfactory kiss off.

Thus in some applications the method may include the step of moving the mould faces relative to each other. However in other applications the method may not include this further step of moving the mould faces relative to each other.

Where the method of manufacture includes the step of moving at least one of the mould faces, the layers of material on the opposed mould faces in the non-hollow areas of the body may either be moulded in the rotational moulding step such that they are spaced apart from each other, eg by a short distance, or alternatively the layers in said non-hollow areas may be moulded in the rotational moulding step such that they are in abutting contact with each other.

Where the body is rotationally moulded such that the layers in the non-hollow areas are spaced apart from each other, the relative movement of the mould faces brings these layers into abutting contact with each other and then urges them firmly into adhesive contact with each other.

Alternatively where the body is rotationally moulded such that the layers of mould material in the non-hollow areas of the body are in contact with each other, the relative movement of the mould faces urge the already abutting layers into firm adhesive contact with each other.

Where the method of manufacture does not include the step of moving the mould faces inwardly towards each other, then the body that is formed by the rotational moulding will have the layers of mould material in the non-hollow areas of the body in contact with each other.

Further the step of moving the mould faces towards each other also confers an ability to control the clearance between opposing surfaces of the fluid ways and thereby the cross-sectional area of the fluid ways, eg the height and width of the fluid ways, by appropriate adjustment of the distance that the mould faces are moved towards each other. The clearance between the surfaces of the fluid ways may also be influenced by the amount or volume of mould material that is introduced into the mould prior to the commencement of the moulding process.

Typically the mould comprises two mould plates each of which defines a said mould face and which in use defines a closed mould cavity. Conveniently both of said mould faces may have one or more said areas projecting outwardly relative to the remainder of the mould face and said outwardly projecting areas on the faces may be vertically aligned with each other. The one or more outwardly projecting areas may comprise a plurality of substantially linearly extending ridges or projections extending between opposed ends of the mould faces, eg parallel to each other but terminating short of said ends of the mould faces.

Each of the mould faces may have further areas that are recessed relative to the remainder of the mould face whereby to form headers, eg of greater cross-sectional area than the fluid ways, at each end of the panel.

The mould faces may be substantially rectangular and may define a substantially rectangular mould surface.

The mould may also include mould formations for moulding inlet and outlet ports in the body in the rotational moulding operation. Further optionally the inlet and outlet ports may be moulded with a screw thread formation thereon for attaching a conduit to the panel. Alternatively the screw thread formation may be tapped into the body in a post-moulding operation.

Typically the inlet port will be located on one side of one end of the panel and the outlet port will be located on the other side of the other end of the panel. Further the panel may be moulded with more than two ports, eg four ports to confer flexibility in the coupling of the panels to each other in a multi-panel heater configuration.

Conveniently the panel may be made from polyethylene, eg HDPE, or polypropylene or indeed any other engineering plastics material.

The invention also extends to a panel produced by the method described above and that can be used as a solar collector panel in a solar heating system.

According to another aspect of the invention there is provided a panel comprising a body having two ends and defining a plurality of parallel fluid ways extending between the opposed ends, and also defining headers at each end of the body extending transverse to the fluid ways and communicating with the fluid ways, the panel being manufactured from a mould material in a mould defining opposed mould faces using a rotational moulding process, wherein at least one mould face has a non planar topography across its surface whereby to form a panel having areas that are not hollow and form the walls between the passageways, and other areas that have hollow passageways and form the fluid ways and the headers.

The panel may be made of a plastics material, eg an engineering plastics material, and may be formed as an integral one piece body. The panel may have a substantially rectangular configuration with two major surfaces and the fluid ways may extend parallel to two sides of the rectangle and the headers may extend substantially parallel to the other two parallel sides of the rectangle. The panel may further include at least one fluid inlet port defined therein towards one end of the body and at least one outlet port defined therein towards the other end of the body. The inlet and out let ports may be formed in the body during the process of moulding the body.

The two opposed mould faces may be moved inwardly relative to each other, eg to squash or clamp the major surfaces of the body, during manufacture of the panel to cause the layers of mould material on the opposed mould faces corresponding to the non-hollow areas of the moulded body to firmly adhere to each other. The mould faces are moved relative to each other after the mould material has been moulded onto the faces of the mould but before it has cooled substantially.

According to yet another aspect of this invention there is provided a solar heater comprising at least one panel as described above according to the previous aspect of the invention mounted on a support.

The support may be a collector box defining a perimeter frame within which the collector panel/s are snugly received. Further the collector box may include a UV and light transparent sheet mounted over the panel/s.

The heater may include a plurality of collector panels, eg coupled in parallel.

The heater may further include a tank operatively coupled to the panel/s whereby water heated up in the panel/s can be transferred to the tank for storage prior to use.

The heater may also include a first conduit coupling one end of the panel/s to the tank and a second conduit coupling an opposed end of the panel/s to the tank.

The heater may also include a safety relief valve for venting any pressure that does build up inside the conduit, tank or panel/s.

DETAILED DESCRIPTION OF A PREFERRED EMBODIMENT OF THE INVENTION

A method of manufacturing a solar collector panel and a solar collector heater in accordance with the invention may manifest it self in a variety of forms. It will be convenient to hereinafter describe in detail several preferred embodiments of the invention with reference to the accompanying drawings. The purpose of this detailed description is to instruct persons interested in the subject matter of the invention how to carry the invention into practical effect. It is to be clearly understood however that the specific nature of this detailed description does not supersede the generality of the preceding broad description. In the drawings:

FIG. 1 illustrates well known constructions in the solar heating art and have been described above in the background to the invention. The following description will focus on the collector panel and solar heater of the invention which are illustrated in FIGS. 2 to 13.

Figure 1:
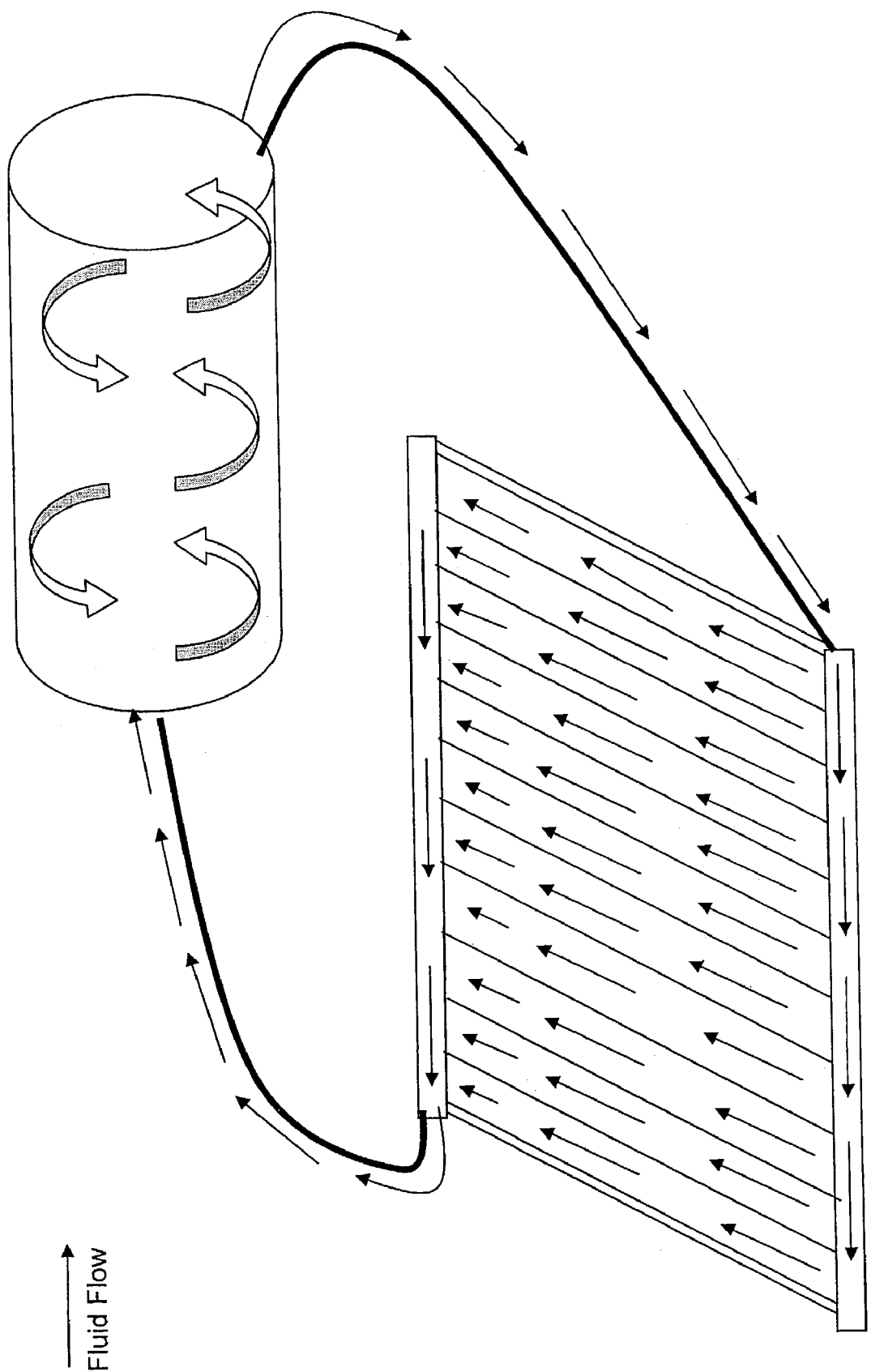
FIG. 1 is a schematic three dimensional view of a solar water heater using a thermo-siphon principle of circulating water around the heater.
Figure 2:
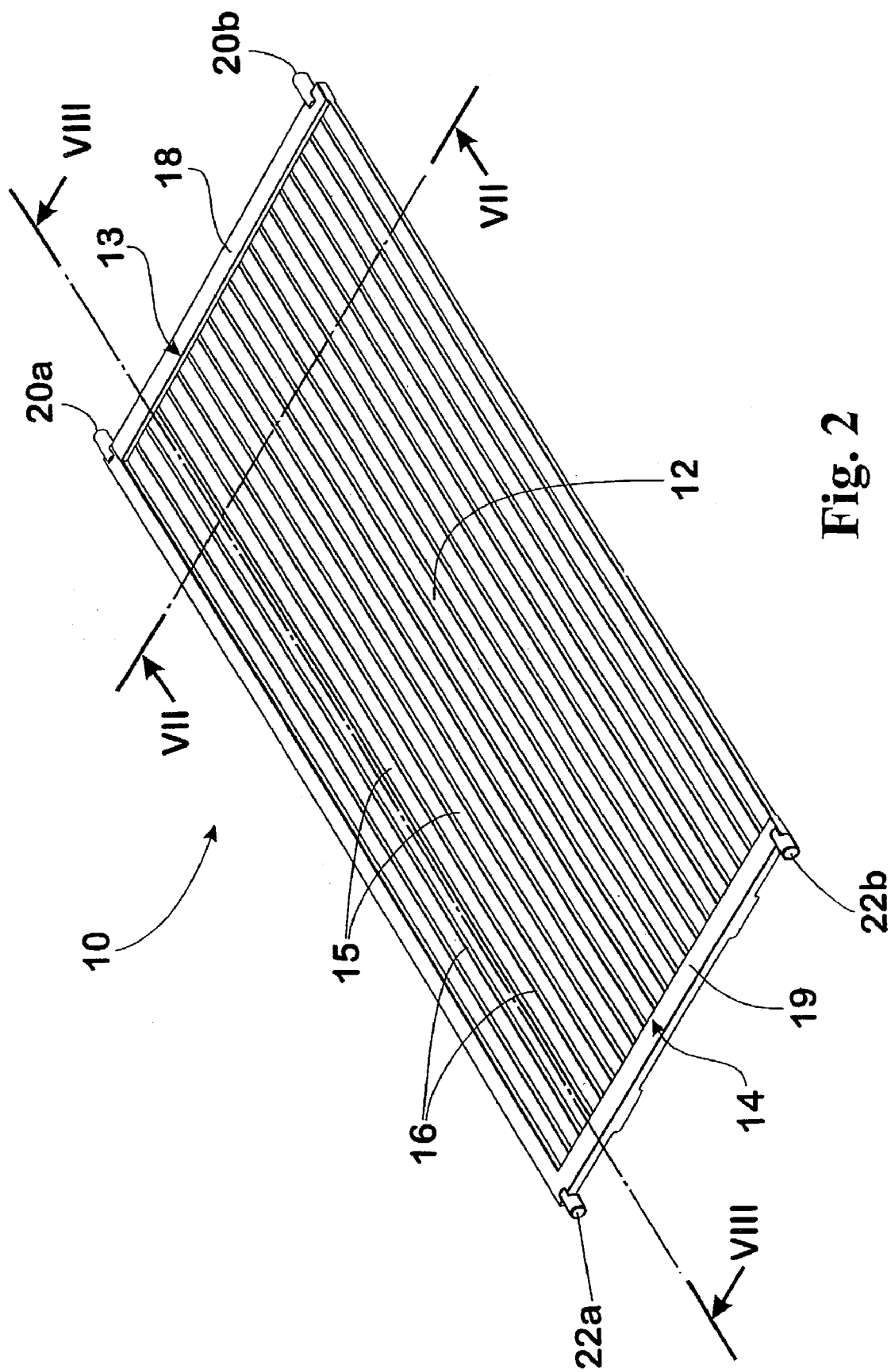
FIG. 2 is a perspective view of one embodiment of a solar collector panel manufactured in accordance with the invention.

In FIG. 2 reference numeral 10 refers generally to a solar collector panel in accordance with the invention.

Broadly the panel 10 comprises a body 12 having one end 13 and an opposed end 14. A plurality of parallel extending fluid ways or passages or conduits 15 are defined in the body extending from the end 13 to the end 14. In the illustrated embodiment there are ten to twenty said fluid ways 15 spaced apart from each other across the width of the panel 10 although the number of fluid ways may obviously vary. Each fluid way 15 corresponds to a strip on the external surface of the body 12 intermediate linearly extending channels or recesses 16. The correspondence between the fluid ways 15 and the strips will become clearer after the moulding process has been described below. Overall the illustrated panel 10 has a substantially flat rectangular configuration with two major surfaces namely an upper and a lower surface and with the fluid ways extending longitudinally between opposed ends of the panel.

The panel 10 also includes transverse headers 18 and 19 that are defined in each end of the body 12 extending transverse to the direction of the fluid ways 15. Each end of each fluid way 15 opens into a said header 18 or 19 such that the headers 18, 19 and fluid ways 15 are in fluid communication.

The panel 10 also includes an inlet port 22(a) that opens into the header 19 and an outlet port 20(b) that opens into the other header 18. Further the inlet and outlet ports 22(a) and 20(b) are located on opposed sides of the panel 10. Two other ports may be formed in the moulded body as shown in the drawings although this is not essential. The ports that are not operationally connected to a conduit in any particular operation or configuration may be blocked off.

Using the embodiment in FIG. 2 cold water would enter the panel from the bottom of the storage tank through inlet 22(a) into header 19. Ports 20(a) and 22(b) would be blanked off, hot water would thermosiphon into header 18 and through outlet 20(b) into the storage tank at a higher level than the cold water out.

Figure 6:
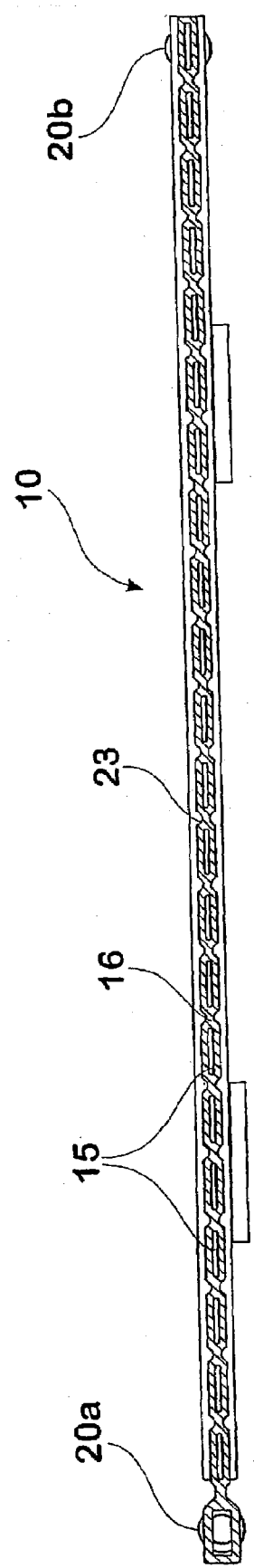
FIG. 6 is a transverse cross-sectional view through the panel of FIG. 2, showing the cross-sectional area of the fluid ways, section through VII—VII.

FIG. 6 shows in some detail the fluid ways 15 that are defined in the body by the rotational moulding process. This drawing shows how the areas of the mould face (illustrated in FIG. 9) that are raised relative to the remainder of the face form the non-hollow areas of the body forming the walls 23 between the adjacent fluid ways 15. The outwardly projecting areas on the mould faces that are ridges form recesses in the moulded body which forms the solid walls between the fluid ways in the body.

Figure 7:
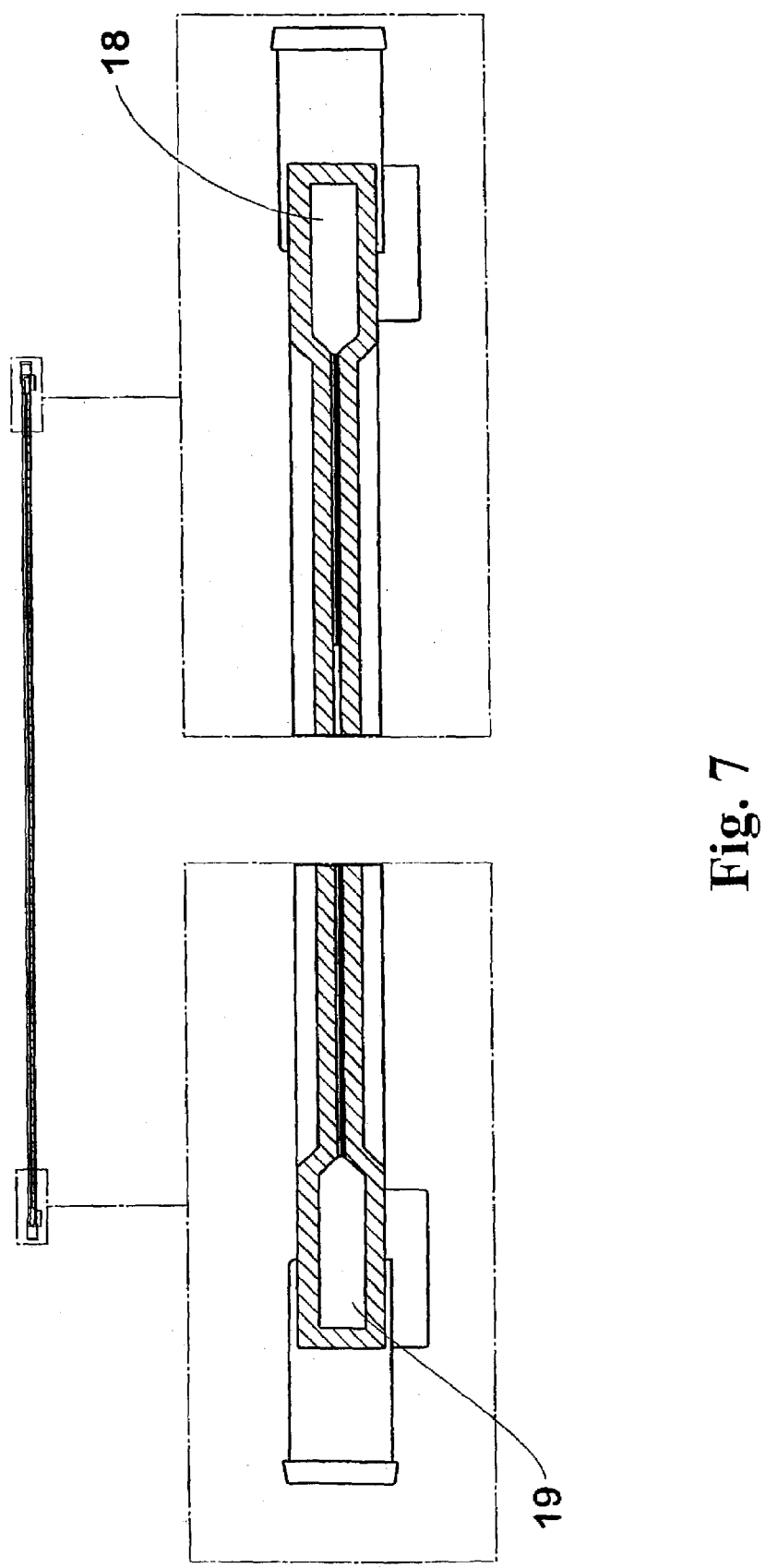
FIG. 7 is a longitudinal section through the panel of FIG. 2 showing the transverse headers and also showing the wall intermediate the adjacent fluid ways section through VIII—VIII.

FIG. 7 shows the headers 18, 19 formed at the end of the fluid ways 15 transverse to the fluid ways 15. Like the fluid ways 15 the headers are formed by adjusting the spacing between the opposing mould faces. The lines or ridges that are raised relative to the remainder of the mould face terminate short of the ends of the panel to enable the transverse headers 18, 19 positioned at the ends of the fluid ways 15 to be defined.

Figure 3:
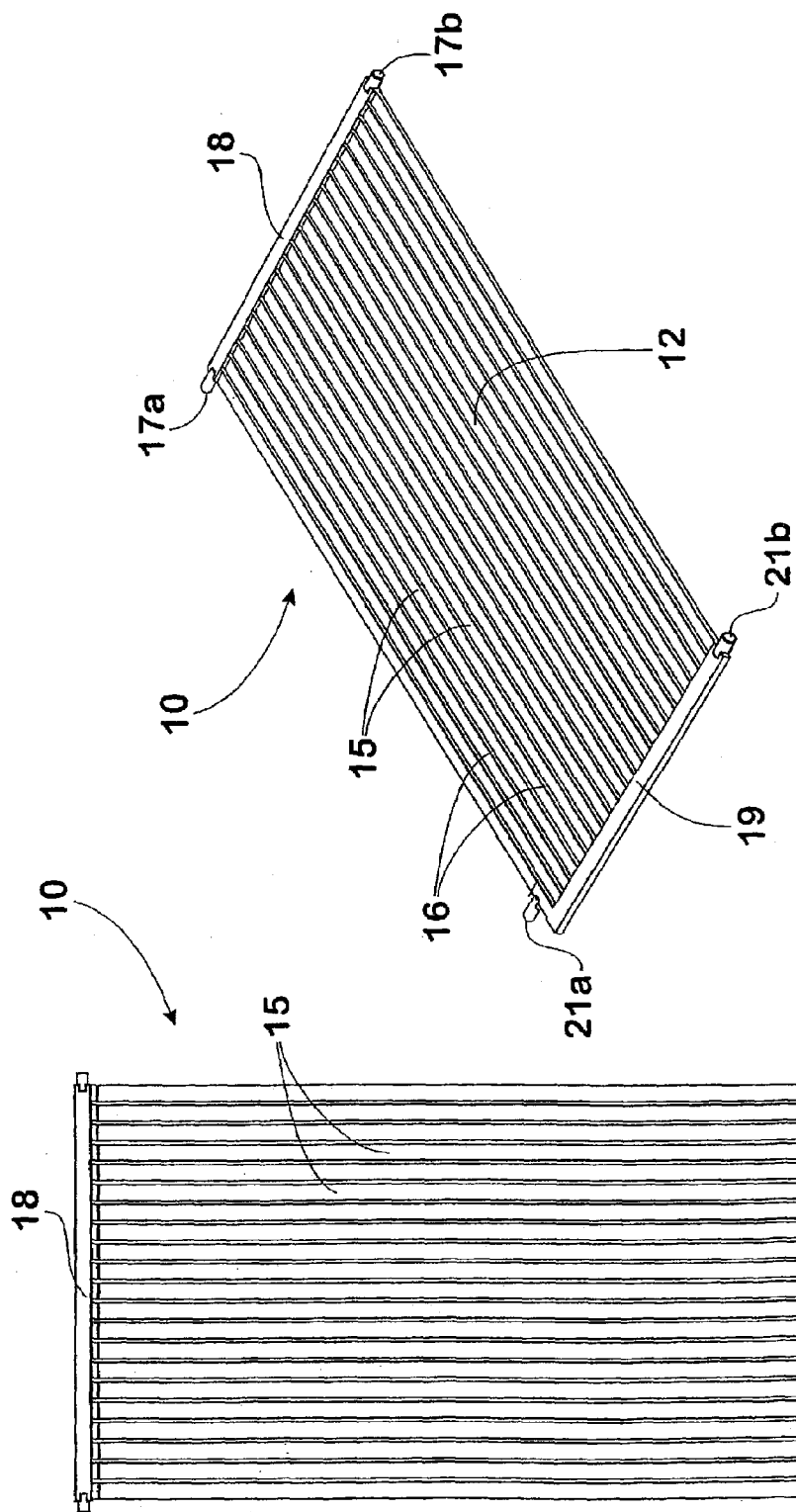
FIG. 3 is a perspective view of another embodiment of a solar collector panel manufactured in accordance with the invention.

FIG. 3 shows an embodiment of this solar panel which is a minor variation on the FIG. 2 embodiment. In the FIG. 3 embodiment the inlet and outlet are arranged transverse to the fluid ways. This is the major difference between this embodiment and the FIG. 2 embodiment. The panel 10 includes an inlet port 21(a) or 21(b) that opens into the header 19 and an outlet port 17(a) or 17(b) that opens into header 18. Preferably, whichever inlet/outlet ports are to be used, they are to be arranged in opposite sides of the panel.

Using the embodiment in FIG. 3 cold water would enter from the bottom of the storage tank through inlet 21(a) via a conduit from storage tank to header 19, ports 21(b) and 17(a) would be blanked off, hot water would thermosiphon into header 18 and through outlet 17(b) into the storage tank at a higher level than the cold water out.

An advantage of this embodiment shown in FIG. 3 is that since the panel is symmetrically arranged and the inlet/outlet ports run transverse the fluid ways, the panel is less susceptible to the effects of possible buckling.

Figure 4:
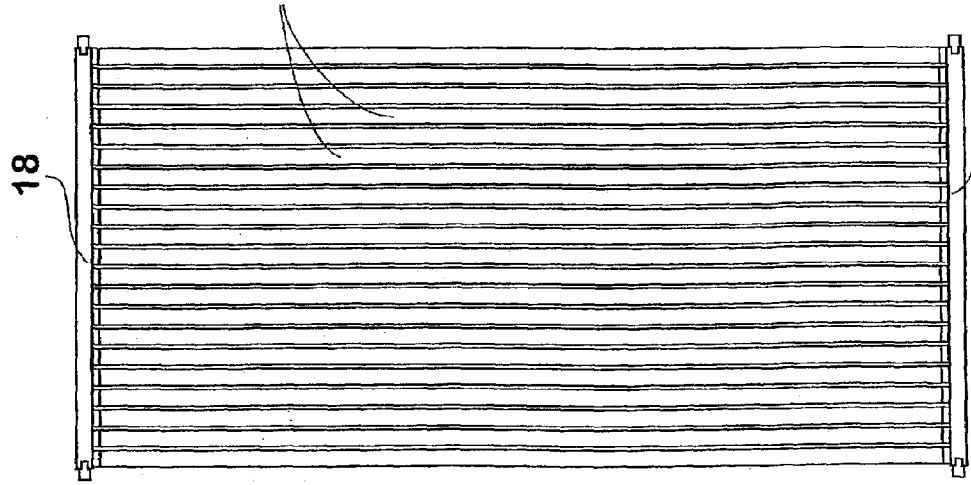
FIG. 4 is a top plan view of the solar panel of FIG. 3.

FIG. 4 shows a top plan view of the panel 10 of FIG. 3. This shows clearly the rectangular outline of the panel and the upper and lower major surfaces.

Figure 5:
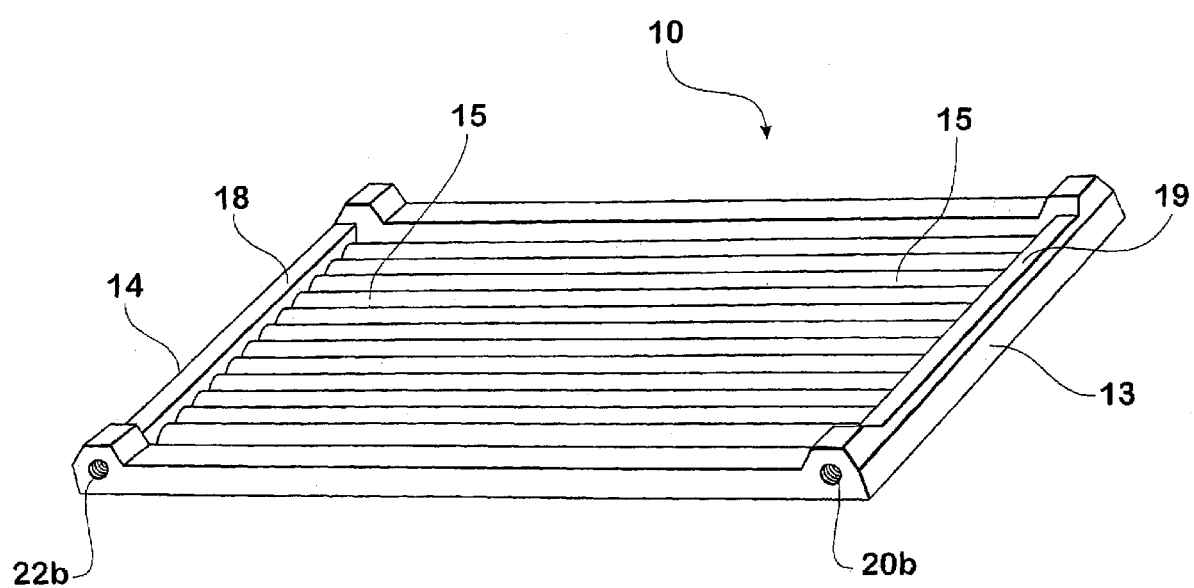
FIG. 5 shows a perspective view of yet another embodiment of a solar collector panel in accordance with the invention.

FIG. 5 shows a further embodiment of the solar panel which is a minor variation on the panel in FIGS. 2 and 3. The variation between this panel and the panels described earlier really amount to matters of engineering detail and the panel is made using the same process as the panels of FIGS. 2 and 3.

Figure 8:
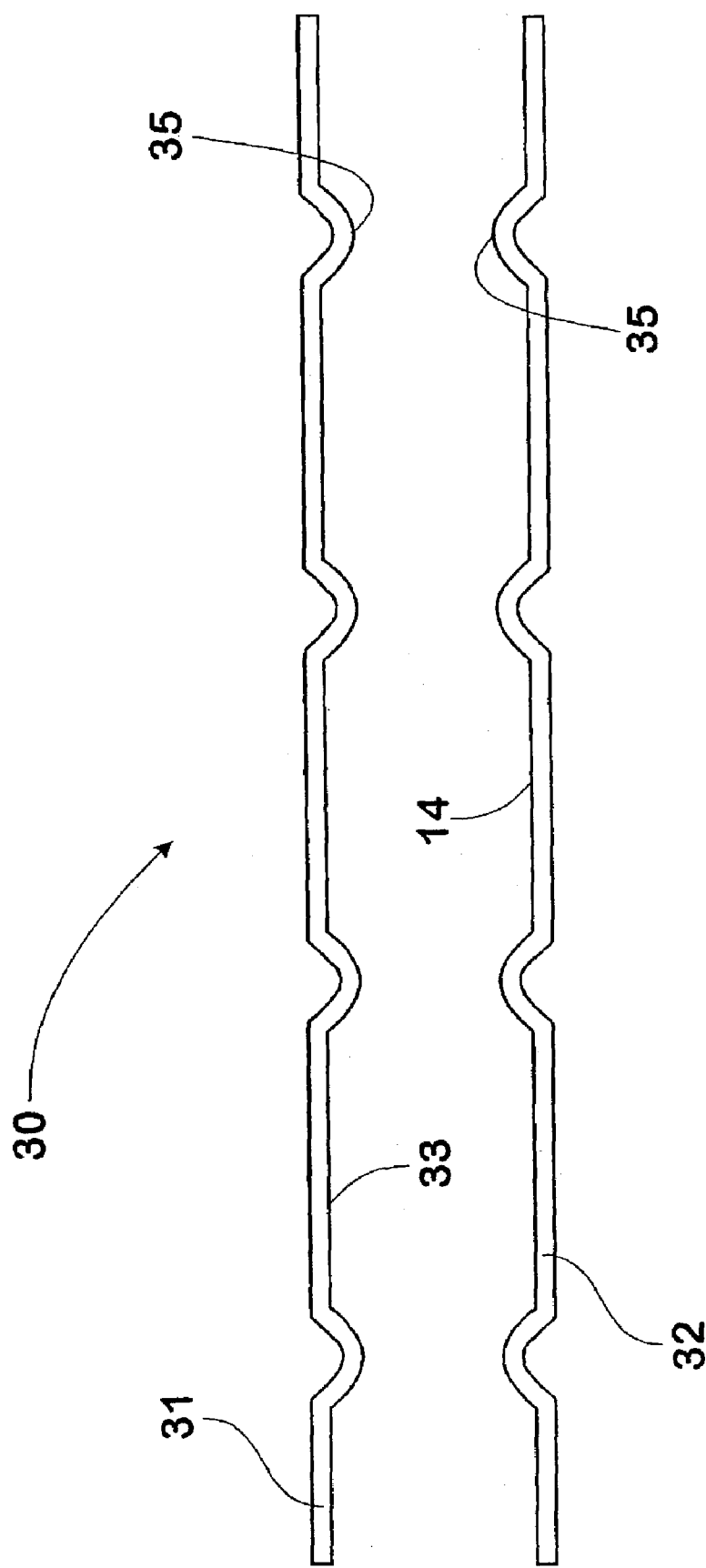
FIG. 8 is a schematic cross sectional view through a rotational moulding apparatus having two opposed mould surfaces for making the panel of FIG. 2 prior to the commencement of the rotational moulding process.

FIG. 8 is a simplified schematic drawing illustrating a rotational moulding apparatus 30 for moulding the panel 10. Broadly the apparatus 30 comprises an upper mould plate 31 and a lower mould plate 32 that come together in an opposed relationship to define the closed mould. Each of the mould plates defines a mould face 33 or 34 of non planar topography that forms the shape of the body, i.e. panel, that is moulded from the apparatus. Each mould face has areas in the form of lines or ridges 35 that project outwardly relative to the remainder of the mould face to form non hollow portions of the moulded body between the fluid ways. The other areas of the surfaces form the hollow portions of the moulded body that form the fluid ways and headers.

The apparatus 30 also includes the other components of a typical rotational moulding apparatus. As these features would be well known to a person skilled in the art and do not form part of the invention they are not shown in the drawings and will not be described in the specification.

The apparatus does have one feature that is a modification of a standard rotational moulding apparatus. The mould plates 31, 32 are mounted so that one plate 31 may be displaced inwardly towards the other plate 32 and then also be displaced back outwardly relative to the other plate 32. This feature is used in a post moulding treatment step that promotes the adhesion of the contacting layers of material to each other and thereby the effective sealing off of adjacent fluid ways 15. The plates are typically moved a distance of 10 mm towards each other, more typically 15 mm to 35 mm towards each other. The distance will vary for different applications and materials.

The above displacement of the plates towards and away from each other may be accomplished by having the mould plates mounted on a slide and locking mechanism. The slide guides a said plate towards and away from the other plate while maintaining the plates in alignment with each other.

The locking mechanism permits the plates to be checked at a desired spacing from each other and held in this position for the post moulding treatment step. While the arrangement described above has been found to be particular useful it is to be clearly understood that a number of other ways of achieving the same result would immediately suggest itself to a person skilled in the art and the apparatus is not to be limited to a slide and locking mechanism.

In use a metered amount of mould material is introduced to the interior of the mould and the mould is closed. The amount of material that is introduced to the mould is calculated very carefully. This is because the amount of material put in initially determines the thickness of the layer of mould material formed on the mould faces. In this particular application it is particularly important that the layer of material is the correct thickness because this is necessary to form a body having hollow fluid ways of the appropriate cross-sectional area for fluid flow and solid walls in between the fluid ways.

Figure 9:
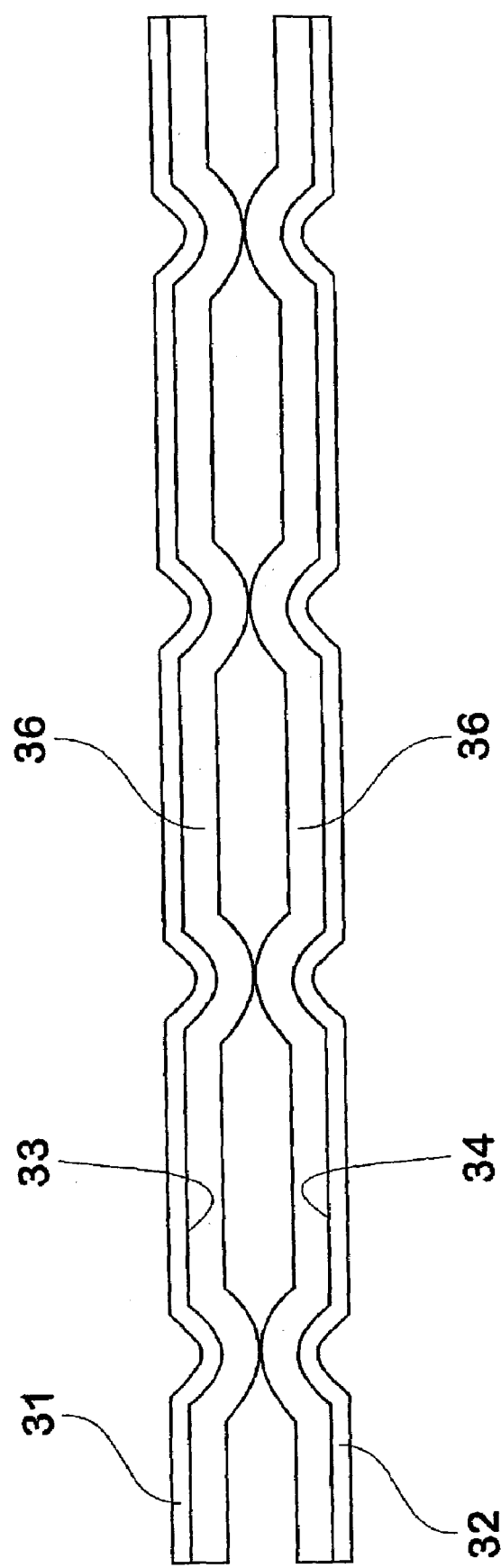
FIG. 9 is a view of the apparatus of FIG. 8 after the rotational moulding step has been carried out.

The mould 30 is then heated up using a radiant heater although clearly convection and conduction heaters can also be used. All that is required is that the mould plates 31, 32 be heated up to a temperature that softens and melts the mould material. The interior of the mould 30 is not pressurised during the moulding operation. The mould 30 is then rotated about two orthogonal axes in the usual way for a rotational moulding apparatus. The rotation spreads the mould material evenly across the mould surface as it softens and melts. A characteristic of rotational moulding is that it deposits an even layer of material across the mould surface and by appropriate design of the shape of the mould a body defining a number of passages or fluid ways with walls between the fluid ways can be moulded. The external shape of the moulded article is determined by the shape of the mould surfaces and not by the rotational motion of the mould. Further by metering the amount of material that is introduced to the mould the thickness of the layer of material deposited on the mould surfaces can be controlled. This produces a moulded body as shown in FIG. 9.

The body formed by the process above could be used directly as a solar collector panel 10. However the Applicant has discovered a post moulding step that substantially enhances the strength of the finished panel. This step involves moving the opposed mould faces towards each other to enhance the adhesion of the layers of mould material in the non-hollow areas of the body to each other.

Figure 10:
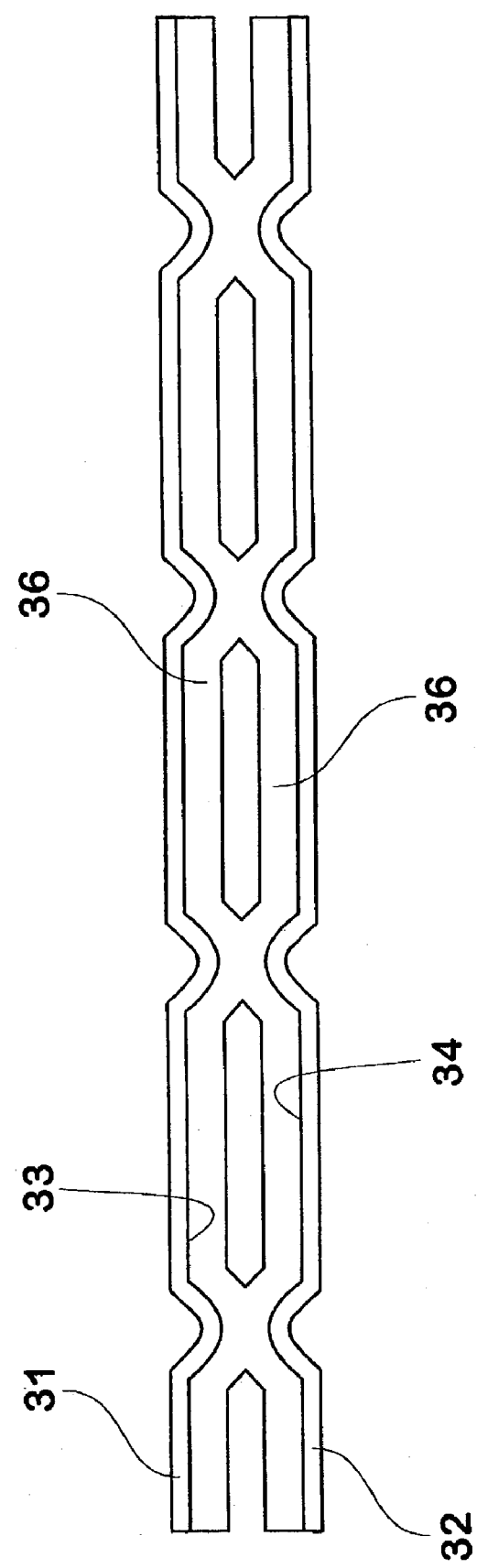
FIG. 10 is view of the apparatus of FIG. 9 after it has undergone a post moulding processing step in which the mould surfaces are displaced towards each other urging the layer of mould material on one surface into contact with the adhesive material on the other mould surface.

As shown in FIG. 10 once the moulding has been completed and before the body is allowed to cool significantly the mould faces are moved towards each other to squash the contacting layers of mould material firmly into adhesion with each other. This causes the layers to adhere efficaciously to each other so that they are disinclined to part or separate when water is displaced through the fluid ways and the water applies pressure to the walls of the body. This achieves a superior kiss off of the moulded material on opposed surfaces of the mould. The extent of the displacement of the plates towards each other in this step can also be used to vary the height or diameter of the fluid ways and headers formed in the body.

After this step the mould plates are allowed to cool back to room or ambient temperature and then the body is removed from the mould. The moulded body is an integral one piece body of plastics material complete with formed fluid ways and headers and inlet and outlet ports that is suitable for use as a solar collector panel. It is formed in a single process which combines conventional rotational moulding with the further step of moving the mould plates towards each other.

Applicant has tested a panel made by the process described above and found that it worked well in a solar heating system using a thermosiphon principle. Further the headers had a clearance of even dimension along their length. In summary the flow passages produced in the body by the moulding process are suitable for the hydraulic flow of water there through at the flow rates and pressures that are encountered in a solar water heater. The fluid ways remained laterally sealed from each other and showed no tendency for the layers forming the walls between the fluid ways to lift and separate when water at moderate pressure was pumped through the fluid ways. This was the case even after the panel had been used for a considerable time. This demonstrates that the contacting layers of mould material forming the walls between the fluid ways had adhered efficaciously to each other.

The heat transfer properties of the collector panel are acceptable although less than those obtained with prior art fabricated panels and the performance of the heater using the panel described above was broadly comparable to that obtained from a prior art panel. Further based on the engineering specifications of the plastics that are used and information obtained from the use of the plastics in other applications where they are exposed to the sun Applicant is confident that the panel will not undergo significant deterioration due to light and UV radiation. The resistance to UV induced deterioration is conferred by modifiers in the plastic.

Figure 11:
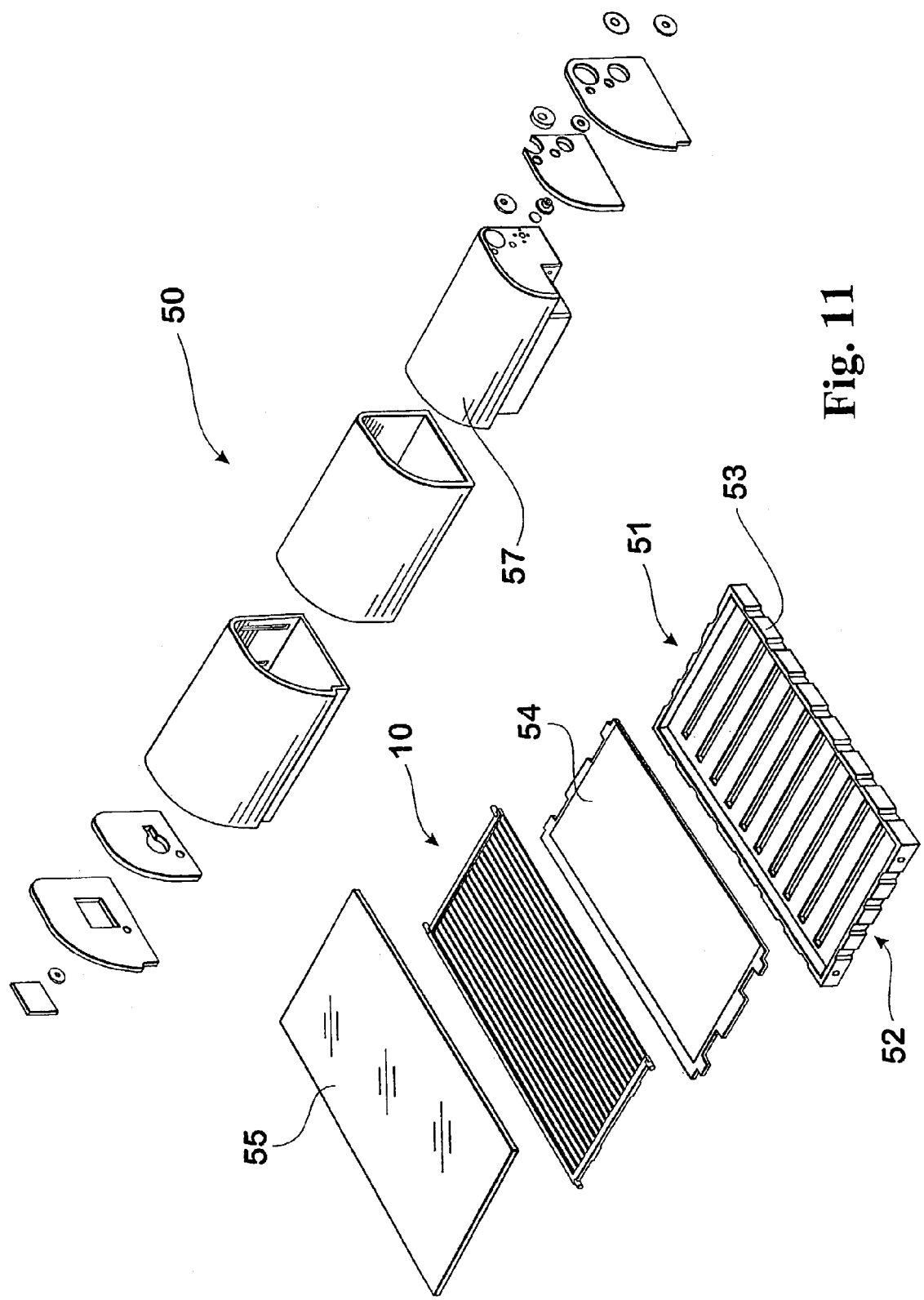
FIG. 11 is an exploded three dimensional view of a solar heater in accordance with one embodiment of the invention having a single solar collector panel.
Figure 12:
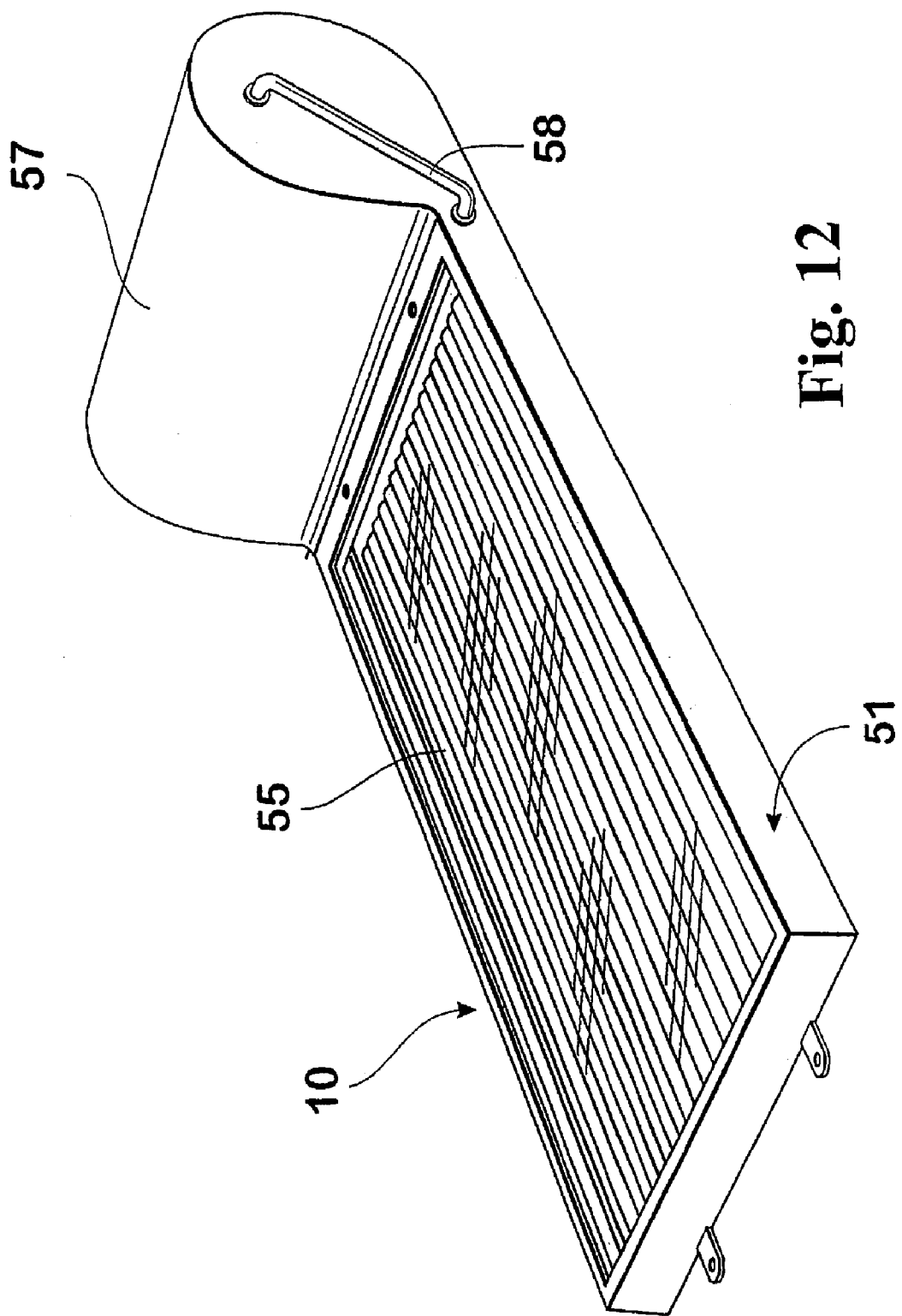
FIG. 12 is a three dimensional view of a heater similar to that in FIG. 11 in an assembled configuration.

FIGS. 11 and 12 show a solar heater assembly including a panel in accordance with the invention. The solar heater assembly is indicated generally by reference numeral 50. Where appropriate the same reference numerals will be used to refer to the same components as in the previous drawings.

The panel 10 is received within a collector box 51 having a base 52 and a perimeter frame 53. The panel 10 fits snugly within the perimeter frame 53 of the box 51. Conveniently a sheet of insulation 54 may be sandwiched between the base 52 of the collector box 51 and the panel 10 to resist heat loss from the hot water flowing through the panel 10 to the surrounding environment including the box 51 and a roof on which the box 51 is mounted. A sheet of glass 55 is mounted over the panel 10 to form the top layer of the box. The glass permits UV and visible light radiation to pass there through but resists heat loss from the panel by convection.

The panel 10 is coupled to a tank 57 which is located proximate thereto. The tank is coupled to the panel by means of external inlet and outlet conduits indicated by numerals 58 and 59 in FIG. 12.

In use the system operates by the same thermosiphon principle described above in the background to the invention. The moulded collector panel is functionally equivalent to the fabricated collector panels of the prior art. While the fluid ways and headers are defined by passages within an integral one piece moulded body of plastic rather than separate pipes the two are functionally equivalent. The heater can be used to heat water up to a temperature suitable for use as hot water in a domestic environment.

Figure 13:
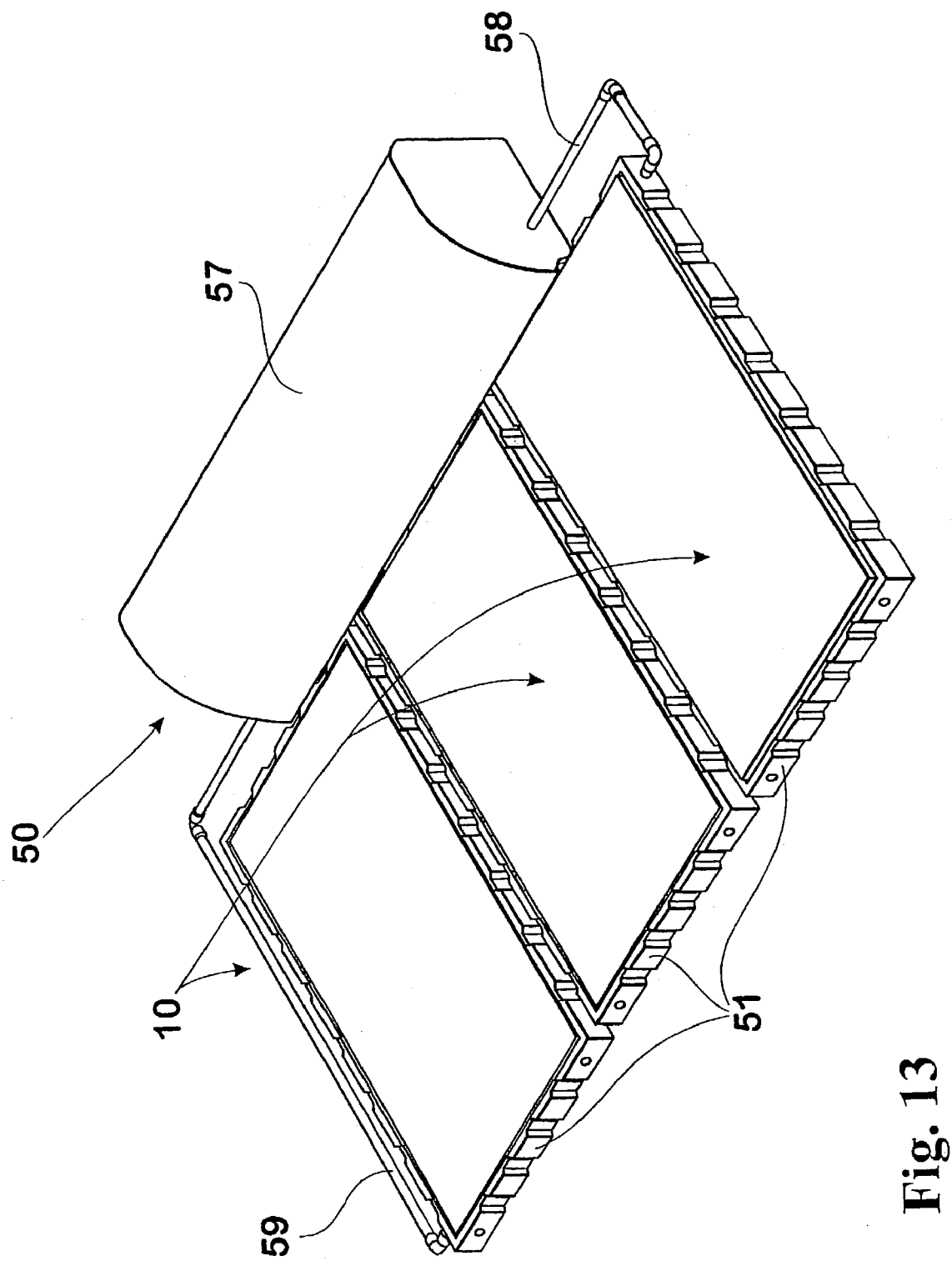
FIG. 13 is a three dimensional view of a solar heater in accordance with another embodiment of the invention having three panels operatively connected to each other side by side and showing the modular use of the panels in the heater.

FIG. 13 illustrates a heater in accordance with the invention that is a variation on the heater shown in FIG. 12.

This heater 50 comprises a number of panels 10, eg three, received within the collector box 51 and positioned side by side. The panels 10 are essentially connected in parallel with each other. That is water that is returned to the panels makes a single pass through one of the panels and is then displaced back into the tank.

The addition of further collector panels 10 in parallel confers additional heating capacity on the heater. The heater is modular in the sense that a single size collector panel can be manufactured in a moulding operation and then an appropriate number of panels selected to provide a heater with the required heating capacity. It is not necessary to manufacture a number of different sized collector panels.

In a further embodiment the heater is used to heat swimming pool water that is passed there through and then returned to the pool. The heater typically comprises one or more collector panels mounted on a roof. The inlet port of the collector panels are coupled to the discharge line of a pool pump and this pumps water through the fluid ways of the collector panels where it is heated in the same way as described above. The discharge port of the panels returns the heated water to the swimming pool. Water is thus pumped through the panel in a single pass and that single pass might heat it by several degrees and then it is returned to the swimming pool. In this application water is not continuously circulated through the system using the thermosiphon effect to achieve temperatures of 60 degrees Celsius or higher. It is simply a case of pumping water through the collector panels to effect low level heating.

An advantage of the solar collector panel described above is that it is formed as a single integral one piece body in a single rotational moulding process. The rotational moulding process enables a body having parallel fluid ways and headers at the ends of the fluid ways to be formed in a single moulding operation. As a result the manufacture of the panel can be accomplished considerably cheaper than with prior art panels that are fabricated from metal.

The panel is formed from a plastics material that has a suitability high coefficient of thermal conduction and is resistant to degradation by visible light and UV rays. Applicant has found that such a plastic body can be sufficiently efficacious in conducting energy from the sun through to water passing through the fluid ways defined in the moulded body.

A further advantage of the heater described above is that the panels are modular in the sense that additional heating capacity can be obtained by adding further panels. Additional collector panels can simply be coupled to the system in parallel to provide additional fluid ways and additional heating capacity. Thus only a single size panel need be manufactured.

It will of course be realised that the above has been given only by way of illustrative example of the invention and that all such modifications and variations thereto as would be apparent to persons skilled in the art are deemed to fall within the broad scope and ambit of the invention as herein set forth.

The invention claimed is:

1. A method of manufacturing a solar collector panel having two opposed ends defining a plurality of fluid ways extending there between and transverse headers at said opposed ends opening into open ends of the fluid conduits, the method comprising:

providing a mould defining opposed mould faces that are spaced apart from each other wherein the spacing between the mould faces is not equal across the surface of the faces;

inserting a mould material into the mould and moulding a body by a rotational moulding process so as to produce a layer of material of substantially uniform thickness across the surface of the mould faces; and allowing the mould and body to cool after the layer of material has been evenly moulded onto the mould surface and then removing the body from the mould whereby the unequal spacing between the mould surfaces facilitates the formation of said panel with areas that are not hollow and other areas that have hollow passages defined therein, the hollow passages defining the fluid ways and transverse headers and the non hollow areas defining the walls between the fluid ways;

said method comprising the further step of moving the mould faces, and thereby the layers of moulded material on the faces, towards each other a certain distance after the moulding step has been carried out and before the body is given time to cool, to urge the moulded material on said non hollow areas of the body firmly into adhesive contract with each other to achieve fluid sealing of the walls between adjacent fluid ways and headers.

2. A method according to claim 1, wherein the unequal spacing of the mould faces across the surface of the faces is achieved by having an uneven topography on at least one of the mould faces whereby to form the parts of the moulded body that are not hollow and form other areas of the body with hollow passages.

3. A method according to claim 2, wherein one or more parts of said mould face projects outwardly relative to the remainder of said face over said one area to form said non hollow parts of the body and the remainder of the body forms the hollow parts.

4. A method according to claim 1, wherein the mould faces are moved towards each other by a distance of 5 mm to 30 mm.

5. A method according to claim 1, wherein the mould comprises two mould plates each of which defines a said mould face and which in use defines a closed mould cavity.

6. A method according to claim 3, wherein both of said mould faces have parts projecting outwardly relative to the mould face and said outwardly projecting parts on the two faces are vertically aligned with each other.

7. A method according to claim 6, wherein said one or more outwardly projecting parts comprise a plurality of substantially linearly extending lines extending between opposed ends of the mould faces.

8. A method according to claim 6, wherein linearly extending lines are parallel to each other and each of said lines terminates short of said ends of the mould plates.

9. A method according to claim 1, wherein the panel is an integral one-piece body having a substantially rectangular configuration having two major surfaces and the panel is made from an engineering plastics material.

10. A method according to claim 1, wherein the mould faces further comprise a mould formation for moulding an inlet port in the collector panel towards one end thereof and a further mould formation for moulding an outlet port in he collector panel towards an opposed end thereof.

* * * * *

UNITED STATES PATENT AND TRADEMARK OFFICE
CERTIFICATE OF CORRECTION

PATENT NO.        : 7,083,755 B2                                         Page 1 of 1
APPLICATION NO.   : 10/238460
DATED             : August 1, 2006
INVENTOR(S)       : Noel Richard Drummond et al.

It is certified that error appears in the above-identified patent and that said Letters Patent is hereby corrected as shown below:

Column 12, Claim 1, Line 21, Replace "contract" with --contact--.

Signed and Sealed this

Twenty-sixth Day of December, 2006

JON W. DUDAS
*Director of the United States Patent and Trademark Office*